June 13, 1972  TOURU INOUE ET AL  3,669,639
METHOD FOR PRODUCTION OF FUSED ENERGY-CONDUCTING STRUCTURE
Filed Oct. 17, 1969  4 Sheets-Sheet 3

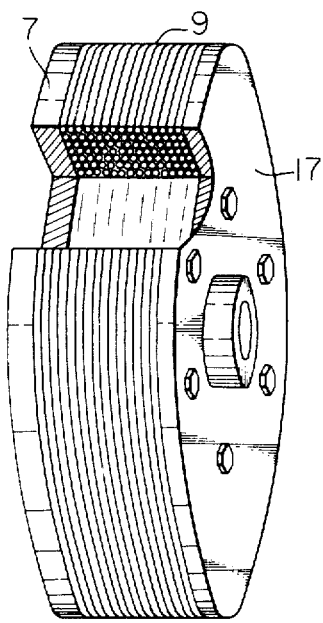
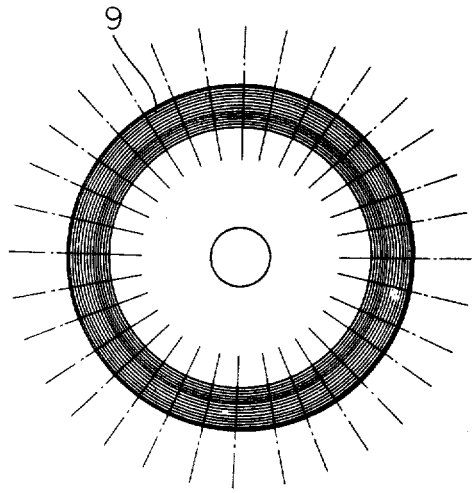
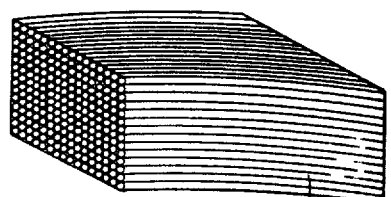
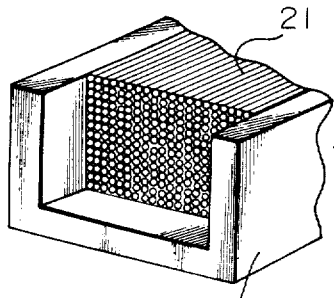
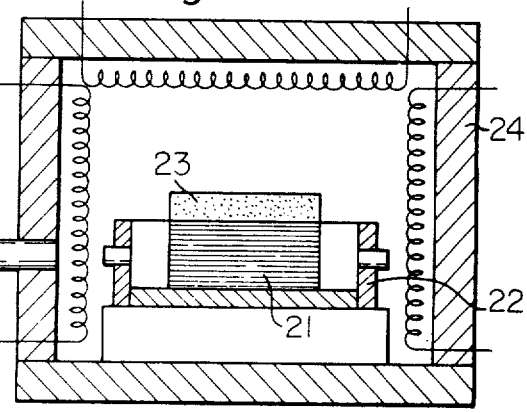

TOURU INOUE,
TETSUYA YAMADA and
SEIZO NOGUCHI,
INVENTORS

BY *Wendroth Lind*
and *Ponack* ATTORNEYs

TOURU INOUE,
TETSUYA YAMADA and
SEIZO NOGUCHI,

INVENTORS

United States Patent Office 3,669,639
Patented June 13, 1972

3,669,639
METHOD FOR PRODUCTION OF FUSED ENERGY-CONDUCTING STRUCTURE
Touru Inoue, Nishinomiya-shi, Tetsuya Yamada, Takarazuka-shi, and Seizo Noguchi, Amagasaki-shi, Japan, assignors to Nippon Sheet Glass Co., Ltd., Osaka, Japan
Filed Oct. 17, 1969, Ser. No. 867,260
Claims priority, application Japan, Oct. 23, 1968, 43/77,179
Int. Cl. C03c 23/20, 19/00
U.S. Cl. 65—4
9 Claims

ABSTRACT OF THE DISCLOSURE

A method for the production of a fused energy-conducting structure, which comprises cementing a plurality of energy-conducting filaments or multifilaments with a heat-sublimable or heat-volatile binder material in a parallel arrangement, heating the resulting bundle of energy-conducting filaments or multifilaments cemented with said binder material thereby to cause sublimation or vaporization of said binder material, and heat-fusing said energy-conducting filaments or multifilaments with one another.

---

This invention relates to a method for the production of a fused energy-conducting structure.

Various methods have been practiced heretofore for producing a vacuum-tight optical fiber bundle using optical fibers consisting of a light-transferring core having a relatively high refractive index and a covering layer having a relatively low refractive index.

One typical prior method comprises cutting an optical fiber bundle wound irregularly onto a drum to the desired length, putting said optical fiber bundles into a tube and causing a parallel alignment of the individual fibres, thereafter putting the aligned fibers into a glass tube with one sealed end, heating said glass tube while exhausting gas from its open end and exerting a fluid pressure whereby said glass tube is extended and the optical fibers are melt-adhered to one another, cutting said glass tube at right angles to its longitudinal direction, and polishing both end surfaces thereby to produce vacuum-tight optical fiber bundles. As another method, U.S. Pat. 3,216,807 discloses a method for making cathode ray tube face plates which comprises bundling optical fibres, heating the bundles of optical fibers in a former thereby to fuse the peripheral part of the bundles, heating and extending said optical fiber bundles thereby to fuse the optical fibers to one another and make rectangular optical fiber bundles, cutting said optical fiber bundles to the desired length, gathering the desired number of cut bundles of the desired size, and heating and tightening the gathered bundles to fuse respective bundles to one another.

The first-mentioned prior method, however, has the disadvantage that the diameter of an optical fiber bundle which can be produced is limited because an exterior heat can hardly be transmitted into the center of the bundle in the step of fusing optical fiber bundle, and this makes it difficult to produce face plates having a large diameter. Moreover, the presence of a glass tube on the outer surface constitutes a draw back to the production of face plates with a large diameter. According to the latter-mentioned method, fusion boundaries remain in the resulting face plate because its constituent units are relatively small in size, and this causes deterioration in the quality of a transferred image.

An object of the present invention is to provide a method for producing a fused energy-conducting structure free from the above-mentioned defects.

Another object of the invention is to provide an economical method of producing a fused energy-conducting structure with a simple operation.

Still another object of the invention is to provide a method for producing a large fused energy-conducting structure free from fusion boundaries.

The present invention provides a method for producing a fused energy-conducting structure which comprises cementing a plurality of energy-conducting filaments or energy-conducting multifilaments with a heat-sublimable or heat-volatile binder material in a parallel arrangement, heating a bundle of the cemented energy-conducting filaments or multifilaments thereby to cause sublimation or vaporization of said binder material, and heat-fusing the individual energy-conducting filaments or multifilaments to one another.

The invention also provides a method for producing a fused energy-conducting structure which comprises cementing a plurality of energy-conducting filaments or multifilaments with a heat-sublimable or heat-volatile binder material in a parallel arrangement, removing the peripheral part of a bundle of the cemented energy-conducting filaments or multifilaments thereby to form a unit of a certain shape, heating this unit to cause sublimation or vaporization of said binder material, and heat-fusing the energy-conducting filaments or multifilaments in said unit to one another.

By the term "energy-conducting filament" used in the present specification and claims is meant a monofilament of a transparent glass which transfers energy in a direction of the filament axis, an example of which is a glass monofilament having a diameter of $10\mu$ to $200\mu$ and consisting of a core of flint glass having a relatively high refractive index, for instance, 1.60 to 1.85 and a sheath of crown glass having a relatively low refractive index, for instance, 1.48 to 1.54. The term "energy-conducting multifilament" used throughout the present specification and claims means a glass filament having a diameter of about $30\mu$ to $200\mu$ and consisting of a predetermined number (for example, about 4 to 20) of said energy-conducting filaments fused to one another.

In the present invention, a multiplicity of energy-conducting filaments or energy-conducting multifilaments (these filaments may sometimes be referred to merely as energy-conducting filaments) are cemented with a heat-sublimable or heat-volatile binder material. This procedure can be effected by unwinding energy-conducting filaments wound on a drum of a certain diameter while passing the filaments through a bath of said binder material, winding the so treated filaments onto a drum having a diameter of 300 to 1000 mm. in a regular parallel relationship, and then solidifying the binder material. The procedure can also be conducted by treating a bundle of a certain thickness consisting of energy-conducting filaments with a water stream to arrange the filaments in parallel relationship with one another, and cementing the so treated bundle with a binder. At this time, the so treated bundle containing water may be inserted into a heat-shrinkable tube consisting of a thermoplastic resin such as polyethylene, followed by heating the tube to shrink it and thereby tighten the bundle; thereafter the bundle is cooled with Dry Ice, for instance, to freeze the water contained therein and thus cement the filaments. If a binder material other than water is used in the foregoing process, it is used in liquid form and the cementing of filaments is effected by solidifying this binder material.

The heat-sublimable or heat-volatile binder materials used in the present invention are solid at room temperature or temperatures below it and liquid or gaseous at room temperature or temperatures slightly higher than it and have the property of completely subliming or vaporizing at elevated temperatures lower than the temperatures at which the energy-conducting filaments are fused. Such binder materials include water, aliphatic monocarboxylic acids having 8 to 18 carbon atoms such as caprylic acid, capric acid, lauric acid, myristic acid, palmitic acid and stearic acid, aliphatic dicarboxylic acids having 4 to 6 carbon atoms such as succinic acid and adipic acid, halogen-substituted carboxylic acids having 2 carbon atoms such as chloroacetic acid, aromatic hydrocarbons having 6 to 10 carbon atoms such as benzene and naphthalene, halogenated benzene such as p-dichlorobenzene, hydroxy-substituted benzene such as phenol and p-cresol, dl-camphene, l-menthol, and cetyl alcohol. These binder materials may be used in the form a solution in a suitable solvent such as methanol, ethanol, acetone and ethyl diether. Binders employed preferably in the method of the present invention are water, paradichlorobenzene, naphthalene and l-menthol.

If desired, a bundle of the energy-conducting filaments cemented with these binder materials is cut to predetermined lengths. In cutting the bundle, the bundle of the cemented energy-conducting filaments is removed from the drum, and cut to the desired length, for example, 20 to 30 mm. using such an apparatus as a diamond wheel cutter thereby to make units for the production of a fused energy-conducting structure of the invention as hereinbelow described. The unit so produced which consists of cemented energy-conducting filaments generally has a square or rectangular cross section, whereas a bundle of energy-conducting filaments cemented with a binder material, which has been treated with a stream of water, generally has a circular cross section. The so obtained bundle of cemented energy-conducting filaments is cut to the desired length, and its peripheral part is cut off with an appropriate device such as a thin metal blade to form a prism having a polygonal cross section. The produced prisms are used, as hereinbelow described, as units for making a fused energy-conducting structure. The filaments within the bundle are firmly cemented with one another by a binder material firmly enough to withstand cutting and peripheral part removing operations. The binder materials used in the present invention firmly cement the filaments in the bundle so that these filaments will not be arranged in disorder during the above-mentioned operations. These binders will not damage the filaments during these operations. It is necessary that the above-mentioned operations should be carried out at temperatures which maintain the binder materials solid. These temperatures vary with the binder materials, and usually range from $-20°$ C. to $80°$ C.

A single unit produced in the manner mentioned above usually has a length of about 10 to 50 mm., a width of about 30 to 70 mm. and a height of about 10 to 50 mm. A fused energy-conducting structure can be made from one such unit in accordance with the procedure to be described hereinbelow. It is preferable however to produce a fused energy-conducting structure with a large diameter using a plurality of units. A plurality of such units are combined so that the energy-conducting filaments will be arranged in parallel to one another with respect to their axes thereby to form an assembly of the desired size and shape. The assembly can be produced by heat-melting the binder material at the contacting surfaces of the units, coalescing the units and then cooling them to solidify the binder material, or by coating a minor amount of a binder material on the contacting surfaces, combining the units and then cooling them to solidify the coated binder material. The so produced assembly is placed on a refractory brick in a heating furnace, such as a nichrome electric furnace capable of heating under reduced pressure, and heated to a temperature sufficient for the sublimation or vaporization of the binder material. During heating, the assembly is supported, for preventing its deformation, at its peripheral part or if necessary, at its upper part with a refractory material which does not fuse the glass, while exerting an appropriate pressure on the assembly. Refractory materials are well known in the art, and graphite, boron nitride and silicon nitride can, for instance, be used. For facilitating the sublimation or vaporization of the binder material, it is preferable to effect the heating at reduced pressures, for example, 5 to $10^{-1}$ mm. Hg. The sublimation or vaporization of the binder material is carried out at a temperature lower than the temperature at which the filaments are melted. Although depending upon the binder materials to be used, this temperature generally ranges from 20 to $400°$ C. The heating is continued for a time sufficient to achieve complete sublimation or vaporization of the binder material, generally for 1 to 10 hours. As the binder material is melted and either sublimed or vaporized during this heating operation, the interspaces among the energy-conducting filaments get gradually smaller, and the filaments are arranged regularly in a nearly compacted condition.

After complete sublimation or vaporization of the binder material, the temperature of the heating furnace is raised to temperatures in the vicinity of the softening point of the filaments, generally 450 to $700°$ C., preferably 500 to $600°$ C. An appropriate pressure, for example 5 to 20 kg./cm.$^2$ is exerted during heating on the refractory material at the peripheral part or upper part of the assembly. The heating time should be one sufficient to soften and melt the sheath parts of the filaments and fuse these filaments with one another completely. Generally, this heating time is 1 to 10 hours, preferably 4 to 5 hours.

The so prepared fused energy-conducting structure is composed of regularly arranged and fused energy-conducting filaments without any fusion boundary among the units. This fused energy-conducting structure is vacuum-tight, and does not cause distortion of a transferred image nor does it form a dead spot.

Preferred embodiments of the present invention will be described with reference to the accompanying drawings in which:

FIG. 3 is a view, partly broken away, of a wind-up drum;

FIG. 4 is a view showing the cross section of a bundle of energy-conducting filaments cemented with a binder material;

FIG. 5 is a view showing a unit of a fused energy-conducting structure of the invention, which has been produced by cutting the bundle of filaments shown in FIG. 4;

FIG. 6 is a view showing the setting of the unit shown in FIG. 5 in a former of a fusing apparatus;

FIG. 7 is a sectional view of a heating furnace used in the invention;

One embodiment of the present invention will be described with reference to FIGS. 1 to 9.

Figure 1:
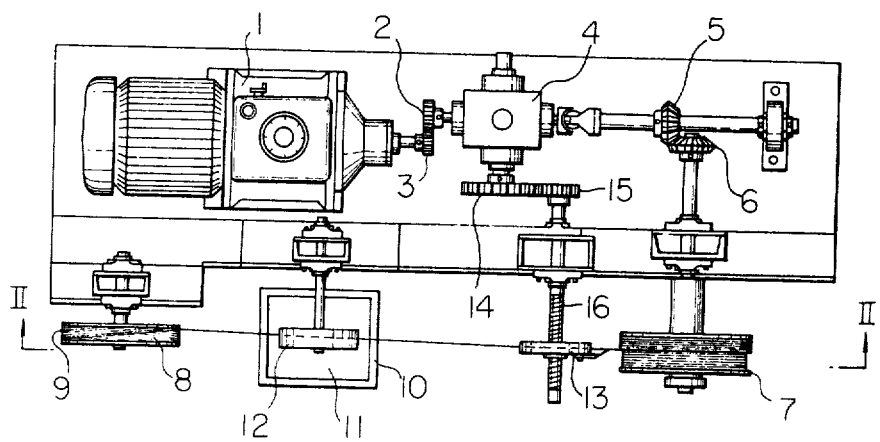
FIG. 1 is a plan of an apparatus for use in accordance with the present invention to apply a binder material to energy-conducting filaments and wind up the filaments on a drum in a parallel relationship.
Figure 2:
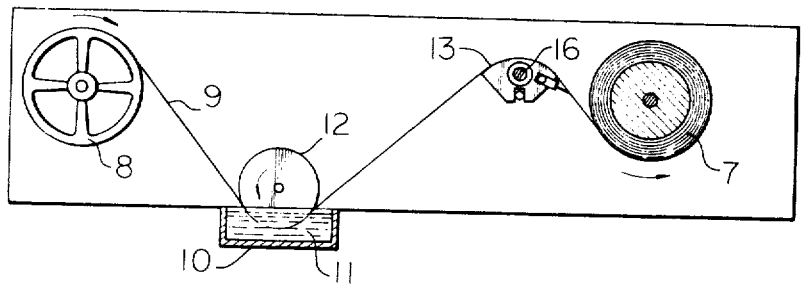
FIG. 2 is a sectional view taken along the line II—II of FIG. 1.

Referring to FIGS. 1 and 2, the rotation of a motor 1 is transmitted to worm reduction gear 4 through gears 2 and 3, and causes the rotation of a filament-arranging drum 7 with a diameter of 300 mm. through bevel gears 5 and 6. An energy-conducting filament 9 having a diameter of 100μ consisting of a flint glass core having a refractive index of about 1.8 and a crown glass covering having a refractive index of about 1.5, which is wound on a bobbin, is conveyed to a binder-treating vessel 10, and immersed by means of a roll 12 in a 50% ethanol solution 11 maintained at about 65° C. of p-dichlorobenzene as a binder whereby a film of the p-dichlorobenzene as binder is coated on the surface of the filament 9.

The filament 9 coated with a film of the binder material is regularly wound up on the filament-arranging drum 7 by means of a delivery guide 13. The delivery guide 13 is moved by the rotation of gears 14 and 15 through the worm reduction gear 4. The moving speed of the delivery guide 13 can be chosen with reference to the diameter and the number of rotations of the drum 7 by appropriately choosing the reduction ratio of the worm reduction gear 4, the ratio of the number of teeth of the gears 14 and 15 and the pitch of a screw 16. The filament 9 is thus wound up on the drum 7 regularly in contact with one another. When the filament 9 is wound up onto the drum 7 a predetermined number of times, the drum is removed from the filament wind-up device. The removed drum is then heated to a temperature of 60° C., i.e., above the melting point of the binder material, and the temperature is then immediately returned to room temperature whereby the filaments adhere to one another firmly. The filaments 9 thus cemented are removed from the drum 7 after taking away a collar 17 of the drum 7 shown in FIG. 3, and are cut to a predetermined size as shown in FIG. 4 to form a unit 21 having a length of 110 mm., a width of 50 mm. and a height of 15 mm., as shown in FIG. 5. The unit 21 is set in a former 22 of a pressurizing apparatus shown in FIG. 6 without undergoing disorder of the arranged filaments, and then fused by means of a filament-fusing apparatus shown in FIG. 7. The pressurizing apparatus 22 is disposed in an electric furnace 24, the inside of which is capable of being reduced in pressure. A pressure of about 10 kg./cm.² is exerted on unit 21 from above by means of a weight 23.

The inside of the electric furnace 24 is maintained at a temperature of about 120 to 140° C., and also reduced in pressure to about 1 mm. Hg by a vacuum pump (not shown) via a pipe 25. Thus, the binder material among the filaments which has become liquid by melting is easily vaporized but the interspaces among the filaments tend to be narrowed by the action of the surface tension of the melted binder material. At the time when the binder material has been completely vaporized, the filament bundle 21 becomes completely compacted. After a lapse of 2 hours, the binder material is completely vaporized. The temperature of the inside of the furnace is maintained for about 4 hours at the softening point (about 600° C.) of the glass covering of the filament while the inside of the furnace is maintained at reduced pressure, whereby the filaments are fused with one another without any interspace. Since heat is transmitted from the direction of the cut surface of the filament bundle 21, a bundle of filaments having a large diameter can also be fused. The fused filament bundle 21, if desired, may be polished at both end surfaces, and a vacuum-tight fused energy-conducting structure having a length of 110 mm., a width of 50 mm. and a height of 15 mm. results.

Figure 8:
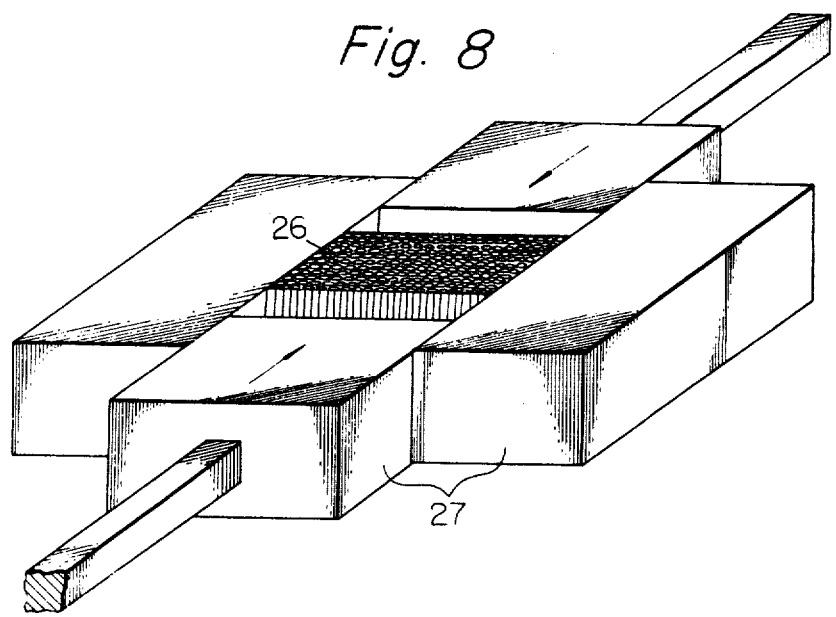
FIG. 8 is a view showing a former of the fusing apparatus used in the present invention.
Figure 9:
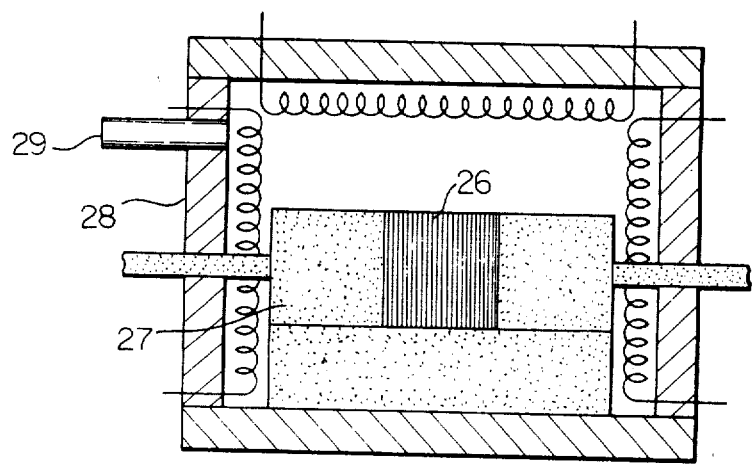
FIG. 9 is a sectional view of a heating furnace including the former shown in FIG. 8.

A fused energy-conducting structure may also be produced in accordance with the above-mentioned procedure using a former of a refractory brick 27 shown in FIG. 8 instead of the above-mentioned former. A unit 26 is put into the former 27 within an electric furnace 28 shown in FIG. 9. The inside of electric furnace 28 is reduced in pressure to about 1 mm. Hg by means of a vacuum pump (not shown) via a pipe 29, and a pressure of about 10 kg./cm.² is applied in the direction of the arrows shown in FIG. 8.

A fused energy-conducting structure can also be produced in accordance with the same procedure as mentioned above using a solution of naphthalene in an alcohol as a binder instead of the solution of p-dichlorobenzene in ethyl alcohol.

The application of the binder material to the filaments may also be effected by coating or spraying the binder material or its solution onto the filaments while the filaments are being wound up onto the drum 7.

Another embodiment of the present invention will be described with reference to FIGS. 10 to 14.

Figure 10:
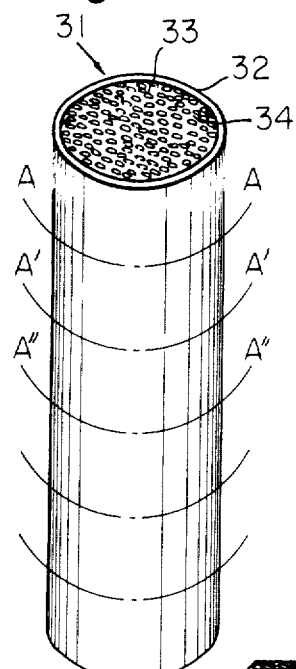
FIG. 10 is a view showing a bundle of energy-conducting filaments put in a tube made of a synthetic resin.
Figure 11:
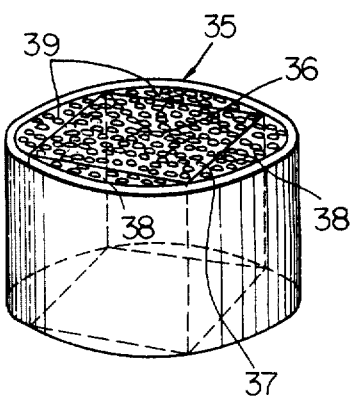
FIG. 11 is a view showing a bundle of filaments in the tube which have been cut off from the bundle shown in FIG. 10.

An energy-conducting multifilament having a diameter of about 50μ consisting of a glass core having a refractive index of 1.8 and a glass covering having a refractive index of 1.5 is wound up irregularly on a drum. A bundle having a length of about 500 mm. and a diameter of about 60 mm. is cut from the wound-up bundle of filaments. One end of the cut bundle is fixed with ring, and a flowing water is poured from the end surface of the bundle to cause parallel arrangement of the filaments. As shown in FIG. 10, a bundle 31 consisting of filaments 33 is inserted in a heat-shrinkable tube 32 of polyethylene. Hot water is poured onto it to shrink the tube 32 and thus tighten the fialments. The bundle is then cooled with Dry Ice to freeze the water present among the filaments 33, and the filaments are cemented by means of ice 34.

Figure 13:
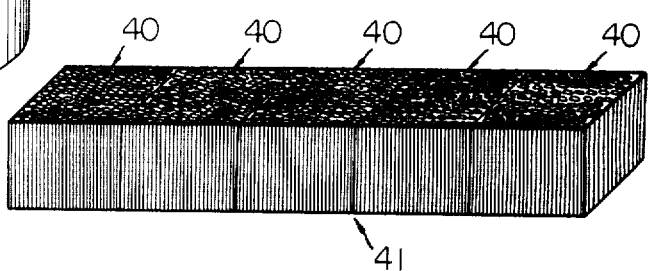
FIG. 13 is a view showing an assembly consisting of a plurality of units of the type shown in FIG. 12.

The bundle 31 cemented with ice as a binder material is cut with a diamond wheel along the lines A—A, A'—A', A"—A" ... to form cylinders 35 each of which has a diameter of about 60 mm. and a height of about 10 mm. A cut 37 is provided by a metal blade on one end surface 36, and the peripheral part 38 is cut off along the axis of the cylinder 35, whereby a unit 40 of prism shape having a length of about 50 mm., a width of about 30 mm. and a height of about 10 mm. is produced. Five units 40 are combined as shown in FIG. 13 to form an assembly 41 having a size of approximately 30 mm. x 250 mm. x 10 mm. When in the above-described procedure, the units 40 are allowed to stand at room temperature for a short period of time to melt the ice to a slight degree, and combined as shown in FIG. 13 and then the resulting assembly 41 is cooled with Dry Ice, the obtained assembly 41 maintains a good coalescing of the units.

Figure 14:
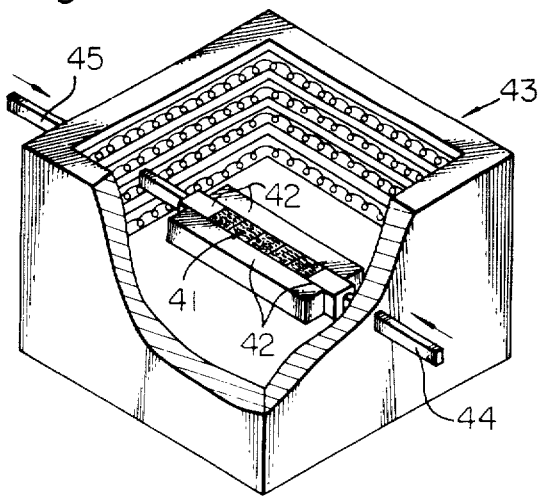
FIG. 14 is a perspective view, partly broken away, of a heating furnace.
Figure 12:
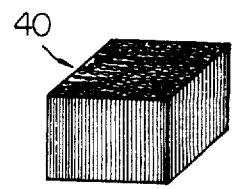
FIG. 12 is a view showing a unit consisting of energy-conducting filaments cemented with a binder material.

As shown in FIG. 14, this assembly 41 is then put into a former 42 made of a special copper alloy capable of pressurizing the assembly in the direction of the arrows, and heated to a temperature of about 110° C. for 5 hours in an electric furnace 43 thereby to liquefy and vaporize the ice completely. Thereafter, the assembly 41 is pressed by means of a pressurizing shaft 44 in the direction of an arrow 44, and concurrently it is heated for 2 hours at about 600° C. thereby to fuse the filaments intimately with one another.

The fused assembly 41 is then cooled gradually, and its surface is polished. The so prepared fused energy-conducting structure has a number of light-transferring cores with a diameter of about 15μ and a size approximately of 20 mm. x 200 mm. x 10 mm. This fused energy-conducting structure is vacuum-tight without any fusion boundary at the coalescing surfaces of the units, and is suitable for use as a face plate of a cathode ray tube.

In the above-described embodiments, a bundle of long filaments cemented with a binder is cut in its longitudinal direction to form a plurality of units, and after sublimation or vaporization of the binder material, the filaments are heat-fused with one another. In another embodiment, filaments cut to a predetermined length are bundled with a binder and the resulting bundle is employed as a unit without further cutting the bundle; thereafter, a plurality of such units are combined, followed by sublimation or vaporization and heat fusion of the filaments.

We claim:

1. A process for the production of a fused energy-conducting structure for image transfer composed of a plurality of energy-conducting filaments which are in parallel arrangement and fused togther, comprising the steps of:
    (a) interposing a heat-expellable liquid binder material selected from the group consisting of p-dichlorobenzene and water among the individual filaments of a bundle of a plurality of energy-conducting filaments in parallel arrangement, the liquid binder being capable of being completely expelled from the energy-conducting filaments by heating it at a temperature lower than the fusing temperature of the filaments;
    (b) cooling the bundle to a temperature sufficient to solidify the liquid binder, thereby cementing the individual filaments of the bundle with the solidified binder;
    (c) removing the peripheral part of the resulting bundle to thereby form a unit having the shape of a polyhedron defined by lateral faces consisting of planes substantially parallel to the longitudinal direction of the filaments and by two, top and bottom, planes at substantially right angles to the direction of the filaments without damaging the surfaces of those filaments at said lateral faces;
    (d) arranging a plurality of said units such that the lateral faces thereof contact each other, thereby forming an assembly;
    (e) heating said assembly to a temperature sufficient to completely expel the binder material but lower than the fusing temperature of the filaments, while maintaining the parallel arrangement of the filaments by supporting said lateral faces of the assemly with a holder, thereby completely expelling the binder material; and
    (f) heating the assembly to the fusing temperature of the filaments, while supporting said lateral faces with the holder and at the same time pressing said lateral faces inwardly along their longitudinal direction.

2. A process as claimed in claim 1, wherein said binder material is expelled by vaporization upon heating and is water.

3. A process as claimed in claim 1, wherein said binder material is expelled by sublimation upon heating and is p-dichlorobenzene.

4. A process for the production of a fused energy-conducting structure for image transfer composed of a plurality of energy-conducting filaments which are in parallel arrangement and fused together, comprising the steps of:
    (a) interposing a heat-expellable liquid binder material selected from the group consisting of p-dichlorobenzene and water among the individual filaments of a bundle of a plurality of energy-conducting filaments in parallel arrangement, the liquid binder being capable of being completely expelled from the energy-conducting filaments by heating it at a temperature lower than the fusing temperature of the filaments;
    (b) cooling the bundle to a temperature sufficient to solidify the liquid binder thereby cementing the individual filaments of the bundle with the solidified binder;
    (c) cutting the resulting bundle to a predetermined length at substantially right angles with the direction of the filaments;
    (d) removing the peripheral part of the resulting cut bundle to thereby form a unit having the shape of a polyhedron defined by lateral faces consisting of planes substantially parallel to the longitudinal direction of the filaments and by two, top and bottom, planes at substantially right angles to the direction of the filaments without damaging the surfaces of those filaments at said lateral faces;
    (e) arranging a plurality of said units such that the lateral faces thereof contact each other thereby forming an assembly;
    (f) heating said assembly to a temperature sufficient to completely expel the binder material but lower than the fusing temperature of the filaments, while maintaining the parallel arrangement of the filaments by supporting said lateral faces of the assembly with a holder, thereby completely expelling the binder material; and
    (g) heating the assembly to the fusing temperature of the filaments, while supporting said lateral faces with the holder and at the same time pressing said lateral faces inwardly, thereby heat-fusing the filaments with one another along their longitudinal direction.

5. A process as claimed in claim 4, wherein said binder material is expelled by vaporization upon heating and is water.

6. A process as claimed in claim 4, wherein said binder material is expelled by sublimation upon heating and is p-dichlorobenzene.

7. A process for the production of a fused energy-conducting structure for image transfer composed of a plurality of energy-conducting filaments which are in parallel arrangement and fused together, comprising the steps of:
    (a) pouring into one end of a bundle of a plurality of energy-conducting filaments a heat-expellable liquid binder material selected from the group consisting of p-dichlorobenzene and water to allow the liquid binder to flow down along the surfaces of the filaments, thereby placing the filaments of the bundle into close, parallel arrangement and interposing the liquid binder among individual filaments, the liquid binder being capable of being expelled completely from the energy-conducting filaments by heating it at a temperature lower than the fusing temperature of the filaments;
    (b) cooling the bundle to a temperature sufficient to solidify the liquid binder, thereby cementing the individual filaments of the bundle with the solidified binder;
    (c) removing the peripheral part of the resulting bundle to thereby form a unit having the shape of a polyhedron defined by lateral faces consisting of planes substantially parallel to the longitudinal direction of the filaments and by two, top and bottom, planes at substantially right angles to the direction of the filaments without damaging the surfaces of those filaments at said lateral faces;
    (d) arranging a plurality of said units such that the lateral faces thereof contact each other, thereby forming an assembly;
    (e) heating said assembly to a temperature sufficient to completely expel the binder material but lower than the fusing temperature of the filaments, while maintaining the parallel arrangement of the filaments by supporting said lateral faces of the assembly with a holder, thereby completely expelling the binder material; and
    (f) heating the assembly to the fusing temperature of the filaments, while supporting said lateral faces with the holder and at the same time pressing said lateral faces inwardly, thereby heat-fusing the filaments with one another along their longitudinal direction.

8. A process as claimed in claim 7, wherein said binder material is expelled by vaporization upon heating and is water.

9. A process as claimed in claim 7, wherein said binder material is expelled by sublimation upon heating and is p-dichlorobenzene.

References Cited

UNITED STATES PATENTS

| | | | |
|---|---|---|---|
| 2,311,704 | 2/1943 | Simison | 65—4 X |
| 2,328,302 | 8/1943 | Simison | 65—4 X |
| 2,484,003 | 10/1949 | Simison | 65—4 X |
| 3,033,731 | 5/1962 | Cole | 65—4 X |
| 3,215,029 | 11/1965 | Woodcock | 65—4 X |
| 3,224,851 | 12/1965 | Hick, Jr. | 65—4 |
| 3,247,755 | 4/1966 | Siegmund | 65—LR DIG |
| 3,383,192 | 5/1968 | Siegmund | 65—4 |

FRANK W. MIGA, Primary Examiner

U.S. Cl. X.R.

65—23, 38, 42, 54, DIG 7